United States Patent
Iga (10) Patent No.: US 7,432,973 B2
(45) Date of Patent: Oct. 7, 2008

(54) DIGITAL CAMERA FOR CAPTURING AN IMAGE WITH A PREDETERMINED COMPOSITION

(75) Inventor: Masahito Iga, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 761 days.

(21) Appl. No.: 11/061,534

(22) Filed: Feb. 18, 2005

(65) Prior Publication Data

US 2005/0179791 A1 Aug. 18, 2005

(30) Foreign Application Priority Data

Feb. 18, 2004 (JP) .............................. 2004-041279

(51) Int. Cl.
*H04N 5/222* (2006.01)
*H04N 5/262* (2006.01)
*G03B 13/02* (2006.01)

(52) U.S. Cl. .................. 348/333.03; 348/239; 396/376

(58) Field of Classification Search ............. 348/14.16, 348/208.6, 208.14, 231.3, 231.6, 333.03, 348/333.02, 333.04; 396/296, 376
See application file for complete search history.

(56) References Cited

U.S. PATENT DOCUMENTS

| | | | | |
|---|---|---|---|---|
| 6,806,906 B1 * | 10/2004 | Soga et al. | ............. | 348/333.03 |
| 7,274,400 B2 * | 9/2007 | Hyodo et al. | ........... | 348/333.02 |
| 7,317,485 B1 * | 1/2008 | Miyake et al. | ......... | 348/333.02 |
| 7,321,393 B2 * | 1/2008 | Kim | ...................... | 348/333.03 |
| 7,349,020 B2 * | 3/2008 | Stavely et al. | ........... | 348/333.02 |
| 2002/0171746 A1 * | 11/2002 | Stephany et al. | ............ | 348/239 |
| 2003/0169350 A1 * | 9/2003 | Wiezel et al. | ................ | 348/239 |
| 2007/0274703 A1 * | 11/2007 | Matsuda | ..................... | 396/264 |

FOREIGN PATENT DOCUMENTS

JP 2000-347277 A 12/2000
JP 2005-167789 A 6/2005

* cited by examiner

*Primary Examiner*—John M Villecco
(74) *Attorney, Agent, or Firm*—Birch, Stewart, Kolasch & Birch, LLP (57) ABSTRACT

A digital camera has a CCD acquiring image information expressing a subject image. Reference pattern information expressing a composition for which photographing is desired is stored in advance in a first memory. A CPU compares the reference pattern information and photograph pattern information, which is pattern information expressed by the image information acquired by the CCD and which corresponds to the reference pattern information, and determines whether or not the subject image expressed by the image information is the composition for which photographing is desired. When the CPU determines that the subject image is the composition for which photographing is desired, the CPU effects control so as to record the image information on a recording medium. Regardless of a form of usage of the digital camera, the digital camera can easily and quickly record desired image information.

18 Claims, 5 Drawing Sheets

SELF-PHOTOGRAPHING MODE

MOVE CURSOR ONTO THE COMPOSITION
YOU WISH TO PHOTOGRAPH, AND SELECT.

DIGITAL CAMERA FOR CAPTURING AN IMAGE WITH A PREDETERMINED COMPOSITION

CROSS-REFERENCE TO RELATED APPLICATION

This application claims priority under 35 USC 119 from Japanese Patent Application No. 2004-41279, the disclosure of which is incorporated by reference herein.

BACKGROUND OF THE INVENTION

1. Field of the Invention

The present invention relates to a digital camera which acquires image information expressing a subject image, and stores the image information on a recording medium.

2. Description of the Related Art

In recent years, as image pickup elements, such as CCDs (Charge Coupled Devices), CMOS (Complementary Metal Oxide Semiconductor) image sensors, and the like have come to have higher resolutions and devices have been made more compact and lighter-weight, digital cameras have become more popular, and the forms in which they are used also have diversified.

The diverse forms of usage of a digital camera include, for example, cases in which the photographer aims the digital camera at himself and extends his arms and photographs so as to capture an image of himself (hereinafter, this form will be called "self-photographing"), cases in which the photographer takes a photograph while holding the digital camera up as high as possible in order to photograph a person or thing over a crowd of people, and the like.

In such forms of usage, because the photographer cannot confirm the composition by using a finder or a liquid crystal panel or the like, he must take the photograph by changing the direction of the digital camera by guessing, and must carry out re-photographing or photographing attempts many times in order to obtain photographed results of a desired composition.

In any case, because the photographer aims the digital camera with his arms extended, even if the period of time from the time when the photographer first aims the digital camera to the time when he carries out photographing is extremely short, it is difficult to maintain the angle and the position of the digital camera. In addition, because the shutter button (release) must be operated in this unstable state, it is easy for blurring due to inadvertent movement of the photographer's hands to occur.

Moreover, because the photographing distance at the time of self-photographing is short, the setting must be changed to a macro photography state depending on the type of camera. In addition, in a camera having a flash-emitting function, if the flash emits light as usual, white spots may arise. Therefore, there are cases in which it is better to prohibit the flash from emitting light.

As the forms of usage of a digital camera have become diverse in this way, techniques for supporting the photographing, such as blurring correction, automatic determination of the photographing timing, automatic changing of the setting in accordance with the photographing state, and the like, have been proposed in order to be able to photograph a subject image well regardless of the form of usage, the level of the photographing techniques of the photographer, the absence/presence of knowledge on the part of the photographer, and the like.

As a technique for automatically determining the photographing timing, there is a conventional technique (see, for example, Japanese Patent Application Laid-Open (JP-A) No. 2000-347277) in which, when photographing is instructed by the photographer, the subject is picked-up and the main subject in the picked-up image is extracted, and when main subjects extracted from plural images obtained by further image pickup satisfy a predetermined condition (i.e., carry out a predetermined movement), it is judged to be the photographing timing.

However, in the aforementioned technique disclosed in JP-A No. 2000-347277, movement of and changes in the main subject are the basis of determining the photographing timing. Therefore, after the main subject is extracted, the movement and changes of that main subject must be detected, and there is the problem that the processing for determining the photographing timing is complex.

Further, in a form of usage in which the image angle is unstable as described above, it is difficult to extract slight movements or changes of the subject. The problem arises in that the determination of the photographing timing is not carried out depending on the form of usage, and the desired image information cannot be obtained.

SUMMARY OF THE INVENTION

The present invention was developed in order to overcome the above-described drawbacks, and provides a digital camera which can easily and quickly record desired image information, regardless of the form of usage.

A first aspect of the present invention is a digital camera comprising: an image pickup unit acquiring image information expressing a subject image; a memory unit in which at least one reference pattern information, which expresses a composition for which photographing is desired, is stored in advance; a determining unit determining whether or not the subject image expressed by the image information is the composition for which photographing is desired, by comparing the at least one reference pattern information and photograph pattern information which corresponds to the reference pattern information and which is expressed by the image information acquired by the image pickup unit; and a control unit effecting control such that the image information is recorded when it is determined by the determining unit that the subject image expressed by the image information is the composition for which photographing is desired.

In accordance with the above-described aspect, the image information expressing the subject image is acquired by the image pickup unit. Reference pattern information, which expresses the composition for which photographing is desired, is stored in advance in the memory unit.

A charge transfer type solid-state image pickup element, such as a CCD, a CMOS image sensor, or the like, can be used as the image pickup unit.

Examples of the memory unit include portable recording media such as Smart Media, xD picture cards, SD cards, memory sticks, Compact Flash(TM), microdrives, and the like, as well as semiconductor memory elements such as RAMs, EEPROMs, flash memories, and the like.

In the digital camera relating to the above-described aspect of the present invention, the reference pattern information and photograph pattern information, which is pattern information expressed by the image information acquired by the image pickup unit and which corresponds to the reference pattern information, are compared. The determining unit determines whether or not the subject image expressed by that image information is the composition for which photographing is desired. If the determining unit determines that the subject image is the composition for which photographing is desired, control is carried out by the control unit to record the image information.

Namely, in the digital camera relating to the above-described aspect of the present invention, the photograph pattern expressed by the acquired image information is compared with the reference pattern expressing the composition for which photographing is desired. That image information is stored only in cases in which the subject image expressed by the acquired image information is the composition for which photographing is desired.

In this way, even if the photographer does not confirm the composition, the composition is automatically determined by the comparison of the reference pattern and the photograph pattern, and the image information is recorded. Therefore, the desired image information can be recorded quickly and easily, even if the image angle is unstable.

Further, because the desired image information is recorded automatically without the intervention of operation of the photographer, there are no effects caused by unintended movement of the photographer's hands.

In this way, the digital camera of the above-described aspect has the image pickup unit which acquires image information expressing the subject image. Reference pattern information expressing a composition for which photographing is desired is stored in advance. The reference pattern information and photograph pattern information, which is pattern information expressed by the image information acquired by the image pickup unit and which corresponds to the reference pattern information, are compared, and it is judged whether or not the subject image expressed by that image information is the composition for which photographing is desired. If it is determined that the subject image is the composition for which photographing is desired, control is carried out to record that image information. Therefore, regardless of the form of usage of the digital camera, the desired image information can be recorded quickly and easily.

The control unit relating to the above-described aspect of the present invention can use, as the reference pattern information, luminance values or contrast values at a plurality of predetermined positions of the composition for which photographing is desired, and can use, as the photograph pattern information, luminance values or contrast values at a plurality of predetermined positions of the subject image on the basis of the image information acquired by the image pickup unit.

In this way, it is easy to compare the reference pattern and the photograph pattern by using, as the predetermined plural positions, positions where there is a great difference in the luminance values or the contrast values at the desired image angle.

These luminance values and contrast values are used in the image processing or the autofocus function or the like at the time of photographing. Thus, a digital camera usually computes the luminance values or contrast values, and there is therefore no need to provide a special detecting means or the like for the determination of the composition relating to the present invention.

The digital camera of the above-described aspect may further have a notifying unit which, when the control unit records the image information, gives notice of that fact. In this way, if the photographer can see or can know of the state of the subject, by providing this notification, the photographer can predict to a certain extent how the subject image, which is expressed by the image information recorded automatically, will be. Further, the position or the angle or the like of the camera which results in the predetermined composition can be known from the position or the angle or the like of the camera at the time of the notification. Moreover, the photographer can know whether or not the image information has actually been recorded.

In addition, a structure is possible in which the control unit can set macro photography, and when it is determined that the subject image is the composition for which photographing is desired and control is effected such that the image information is recorded, the control unit effects control so as to carry out setting of macro photography.

In this way, when photographing a subject at a close distance, such as a case in which the photographer photographs himself, or a case in which the photographer wishes to photograph as large as possible insects, flowers, or the like whose configurations are similar, or the like, the photographer does not need to carry out an operation for setting macro photography, and the convenience can be improved. Further, good subject images can be easily obtained even by photographers who do not know that the setting of macro photography results in better images.

It is also possible to utilize a structure in which, when the digital camera is set such that emitted light is irradiated onto the subject by a flash, and it is determined that the subject image is the composition for which photographing is desired, and control is effected such that the image information is recorded, the control unit controls the light-emitting luminance of the flash so as to lower the light-emitting luminance of the flash.

Namely, when a subject is photographed at a close distance, such as in cases when the photographer photographs himself, or when the photographer wishes to photograph insects, flowers, or the like as large as possible, or the like, the photographer does not need to carry out adjustment of the light-emitting luminance of the flash, such as prohibiting light-emission of the flash or selecting the level of the light-emitting luminance. Therefore, the convenience can be improved. Further, good subject images can be easily obtained even by photographers who do not know that adjusting the light-emitting luminance of the flash results in better images.

When the digital camera is structured such that both setting of macro photography and adjustment of the light-emitting luminance of the flash are possible, the control unit may control both the setting of macro photography and the adjustment of the light-emitting luminance of the flash.

A second aspect of the present invention is a digital camera comprising: an image pickup unit acquiring image information expressing a subject image; a memory unit storing a plurality of reference pattern information which express predetermined photographic compositions which are respectively different; a photograph pattern generating unit generating photograph pattern information on the basis of the image information acquired by the image pickup unit; a determining unit comparing the photograph pattern information and a reference pattern information selected from among the plurality of reference pattern information, and determining whether or not the subject image expressed by the image information matches a photographic composition expressed by the selected reference pattern information; a recording medium; and a control unit effecting control such that the image information is stored on the recording medium, when the determining unit determines that the subject image expressed by the image information matches the photographic composition expressed by the selected reference pattern information.

A third aspect of the present invention is a method of controlling a digital camera which stores a plurality of reference pattern information which express predetermined photographic compositions which are respectively different, the method comprising the steps of: acquiring image information expressing a subject image; generating photograph pattern information on the basis of the acquired image information; determining whether or not the subject image expressed by the image information matches a photographic composition expressed by selected reference pattern information, by comparing the photograph pattern information and the reference pattern information selected from among the plurality of reference pattern information; and storing the image information on a recording medium, when it is determined that the subject image expressed by the image information matches the photographic composition expressed by the selected reference pattern information.

As described above, the digital camera relating to the present invention has the image pickup unit which acquires image information expressing a subject image. Reference pattern information expressing a composition for which photographing is desired is stored in advance. The determining unit compares the reference pattern information and pattern information (i.e., photograph pattern information), which is expressed by the image information acquired by the image pickup unit and which corresponds to the reference pattern information. The determining unit determines whether or not the subject image expressed by that image information is the composition for which photographing is desired. As a result, when it is determined that the subject image is the composition for which photographing is desired, control is effected by the control unit so as to record the image information. In accordance with this structure, there is the excellent effect that, regardless of the form of usage of the digital camera, the digital camera can easily and quickly record desired image information.

DETAILED DESCRIPTION OF THE INVENTION

Hereinafter, a preferred embodiment for implementing the invention will be described in detail with reference to the drawings.

Figure 1:
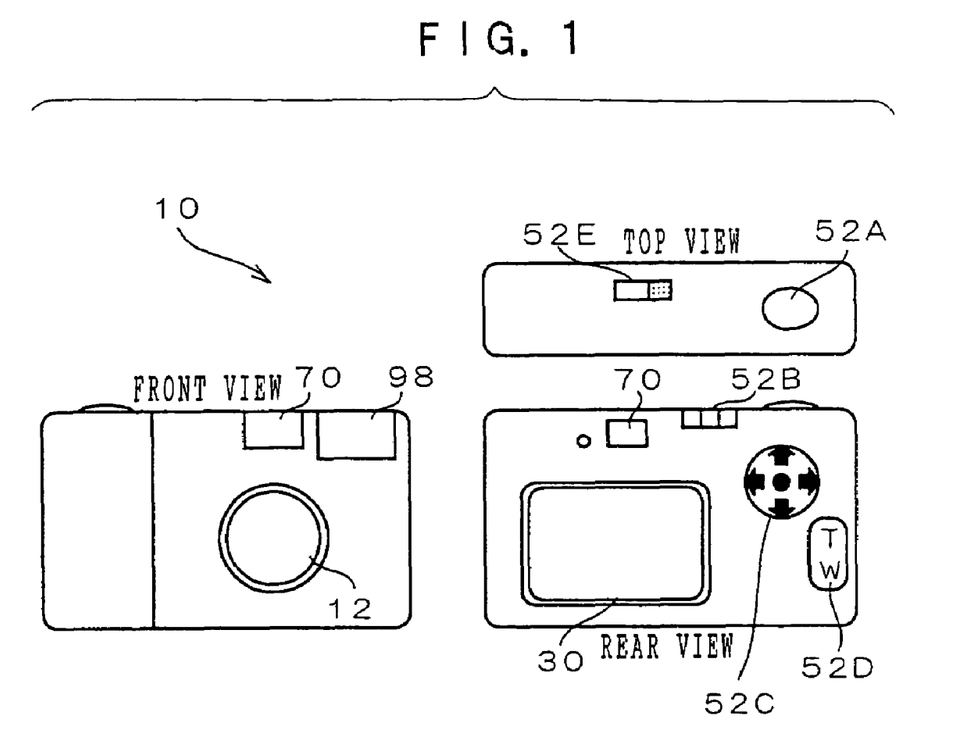
FIG. 1 is an outer view showing the exterior of a digital camera relating to an embodiment of the present invention.

First, the external structure of a digital camera 10 relating to the present embodiment will be described with reference to FIG. 1. As shown in FIG. 1, a lens 12 for focusing a subject image, a finder 70 used for deciding upon the composition of the subject to be photographed, and a flash 98 which, at the time of photographing, emits light and irradiates the light onto the subject, are provided at the front side of the digital camera 10.

A release button (a so-called "shutter") 52A which is pressed and operated by the photographer at the time when photographing is executed, and a power source switch 52E are provided at the top side of the digital camera 10.

The release button 52A in the present embodiment is structured such that two stages of a pressing operation thereof can be detected. These two stages are a state of being pressed to an intermediate position (hereinafter called "half-depressed state"), and a state of being pushed past this intermediate position to its final pressed position (hereinafter called "fully-depressed state").

In the digital camera 10 relating to the present embodiment, due to the release button 52A being set in the half-depressed state, an AE (Automatic Exposure) function works such that the exposure conditions (state) (i.e., the shutter speed, the state of the diaphragm) are set. Thereafter, an AF (Auto Focus) function works such that the focus is controlled. Thereafter, exposure (photographing) is carried out by the photographer continuing to push the release button 52A to its fully-depressed state.

Provided at the rear side of the digital camera 10 are: the eyepiece portion of the finder 70; a liquid crystal display (hereinafter called "LCD") 30 for displaying the subject image expressed by the digital image data obtained by photographing, and various types of menu screens, messages, and the like; a mode switching switch 52B operated in order to set the mode to either a photographing mode which is a mode in which photographing is carried out, or a playback mode which is a mode in which a subject image, which is expressed by digital image data obtained by photographing, is displayed (played-back) on the LCD 30; a cross cursor button 52C; and a zoom switch 52D operated to carry out zooming (enlargement and reduction) of the subject image at the time of photographing.

The cross cursor button 52C is structured so as to include a total of five keys, which are four arrow keys showing the directions of movement in the four directions of top, bottom, left, right in the display region of the LCD 30, and a select key positioned at the center of these four arrow keys. The zoom switch 52D is structured by a tele switch, which corresponds to the position of "T" in the figure and is operated when the subject image is to be enlarged, and a wide switch, which corresponds to the position of "W" in the figure and is operated when the subject image is to be reduced.

Next, the structure of the electrical system of the digital camera 10 relating to the present embodiment will be described with reference to FIG. 2.

Figure 2:
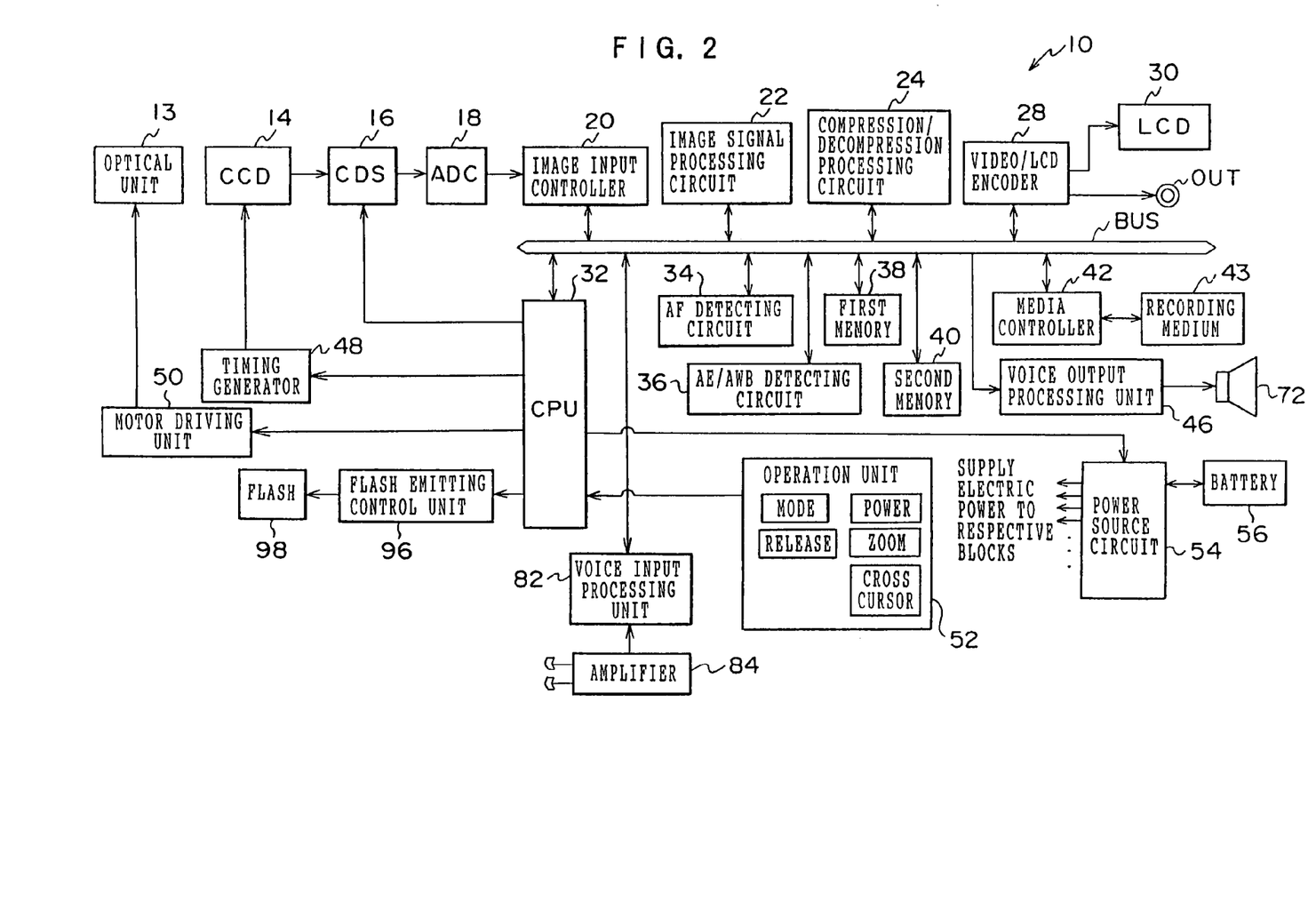
FIG. 2 is a block diagram showing the main structure of an electrical system of the digital camera relating to the embodiment of the present invention.

As shown in FIG. 2, the digital camera 10 has an image pickup system structured so as to include an optical unit 13 which includes the lens 12; a CCD 14 disposed at the back of the lens 12 on the optical axis; a correlated double sampling circuit (hereinafter called "CDS") 16; and an analog/digital converter (hereinafter called "ADC") 18 which converts an inputted analog signal into digital data. The output end of the CCD 14 is connected to the input end of the CDS 16, and the output end of the CDS 16 is connected to the input end of the ADC 18.

The correlated double sampling processing carried out by the CDS 16 is a processing of obtaining accurate pixel data by determining the difference in a pixel signal component level and a feed-through component level which are included in the output signal of each one pixel of a solid-state image pickup element, in order to reduce noise (thermal noise in particular) and the like included in the output signals of the solid-state image pickup element.

The digital camera 10 is structured to include: an image input controller 20 which has built therein a line buffer of a predetermined capacity, and which carries out control to directly store, in a predetermined region of a second memory 40 which will be described later, inputted digital image data; an image signal processing circuit 22 carrying out various types of image processings on digital image data; a compression/decompression processing circuit 24 carrying out compression processing of digital image data in a predetermined compression format, and carrying out decompression processing, in a format corresponding to the compression format, on digital image data which has been subjected to compression processing; and a video/LCD encoder 28 which generates and supplies to the LCD 30 a signal for displaying on the LCD 30 an image expressed by digital image data, menu screens, and the like, and which generates a projected image signal expressing the image displayed on the LCD 30 (an NTSC signal in the present embodiment), and outputs the projected image signal to a video output terminal OUT. The input terminal of the image input controller 20 is connected to the output terminal of the ADC 18.

The digital camera 10 is structured so as to also include a CPU (Central Processing Unit) 32 which governs overall operation of the digital camera 10; an AF detecting circuit 34 detecting physical amounts needed to cause the AF function to work (in the present embodiment, the contrast values of the image obtained by image pickup by the CCD 14 used in photographing); an AE/AWB detecting circuit 36 detecting physical amounts needed to cause the AE function and an AWB (Automatic White Balance) function to work (in the present embodiment, amounts expressing the brightness of the image obtained by image pickup by the CCD 14 used in photographing (hereinafter called "photometric data")); a first memory 38 structured by an SDRAM (Synchronous Dynamic Random Access Memory) and used as a work area or the like at the time of executing various types of processings by the CPU 32; and the second memory 40 structured by a VRAM (Video RAM) which mainly stores digital image data obtained by photographing.

The digital camera 10 also includes a media controller 42 for enabling access, at the digital camera 10, to a recording medium 43 structured by a Smart Media(TM); a speaker 72; a voice output processing unit 46 carrying out processing for outputting voice information to the exterior by the speaker 72; and a voice input processing unit 82 carrying out processings such as converting an analog signal, which expresses voice information inputted via microphones which are provided as two systems (a stereo microphone) and an amplifier 84, into a digital voice signal which can be handled at the digital camera 10, and the like.

The image input controller 20, the image signal processing circuit 22, the compression/decompression processing circuit 24, the video/LCD encoder 28, the CPU 32, the AF detecting circuit 34, the AE/AWB detecting circuit 36, the first memory 38, the second memory 40, the media controller 42, the voice output processing unit 46, and the voice input processing unit 82 are connected to one another via a system bus BUS.

Accordingly, the CPU 32 can respectively carry out control of the operations of the image input controller 20, the image signal processing circuit 22, the compression/decompression processing circuit 24, and the video/LCD encoder 28, the acquisition of the physical amounts detected by the AF detecting circuit 34 and the AE/AWB detecting circuit 36, access to the first memory 38, the second memory 40, and the recording medium 43, output of voice information by the speaker 72 via the voice output processing unit 46, and input of voice information via the microphones, the amplifier 84, and the voice input processing unit 82.

A timing generator 48, which generates a timing signal for driving mainly the CCD 14 and supplies the timing signal to the CCD 14, is provided at the digital camera 10. The input terminal of the timing generator 48 is connected to the CPU 32, and the output terminal of the timing generator 48 is connected to the CCD 14. The driving of the CCD 14 is controlled via the timing generator 48.

The CPU 32 is connected to the input terminal of a motor driving unit 50. The output terminal of the motor driving unit 50 is connected to a focal point adjusting motor, a zoom motor, and a diaphragm driving motor provided at the optical unit 13.

Namely, the lens 12, which is included in the optical unit 13 relating to the present embodiment, has a plurality of lenses, and is structured as a zoom lens whose focal length (magnification) can be changed. The lens 12 has an unillustrated lens driving mechanism. The lens driving mechanism includes the aforementioned focal point adjusting motor, zoom motor, and diaphragm driving motor. The focal point adjusting motor, the zoom motor, and the diaphragm driving motor are respectively driven in accordance with driving signals supplied from the motor driving unit 50 under the control of the CPU 32.

When the optical zoom magnification is changed, the CPU 32 controls the driving of the zoom motor and changes the focal length of the lenses included in the optical unit 13.

The CPU 32 carries out focus control by controlling driving of the focal point adjusting motor such that the contrast values of the image obtained by image pickup by the CCD 14 become maxima. Namely, the digital camera 10 relating to the present embodiment employs, as the focus control, a so-called TTL (Through The Lens) method which sets the positions of the lenses such that the contrast of the read-in image becomes a maximum.

The digital camera 10 is structured so as to also include a flash emitting control unit 96 which controls the emission of light by the flash 98. In the present embodiment, the light-emitting luminance of the flash 98 can be adjusted in plural stages. The flash emitting control unit 96 is connected to the CPU 32, and, under the control of the CPU 32, controls the light-emitting luminance adjustment of the flash 98 and the emission of light at a predetermined time.

The respective buttons and switches which are the release button 52A, the mode switching switch 52B, the cross cursor button 52C, and the zoom switch 52D, and the power source switch 52E (referred to collectively as "operation unit 52" in FIG. 2) are connected to the CPU 32. The CPU 32 can always know of the operational states of these buttons and switches.

The digital camera 10 relating to the present embodiment has a power source circuit 54 and a battery 56. Under the control of the CPU 32 and on the basis of electric power inputted from the battery 56, the power source circuit 54 generates appropriate electric power for operation and supplies the electric power to the respective units. Note that, in order to avoid confusion, illustration of the connecting wires from the power source circuit 54 to the respective units to which electric power is supplied, is omitted from FIG. 2.

The digital camera 10 relating to the present embodiment has, as one of the aforementioned photographing modes, a "self-photographing mode" which is selected at the time of self-photographing when the photographer himself aims the camera toward himself, extends his arms, and photographs so as to capture an image of himself.

Reference pattern information, which expresses predetermined compositions used at the time when the self-photographing mode is employed, is stored in advance in the first memory 38.

Figure 3A:
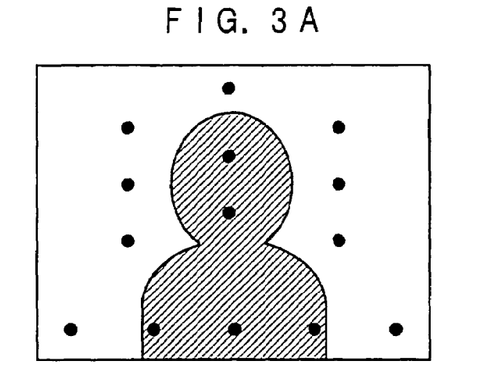
FIGS. 3A through 3C are respectively explanatory drawings schematically showing predetermined compositions used in self-photographing, relating to the embodiment of the present invention.
Figure 3B:
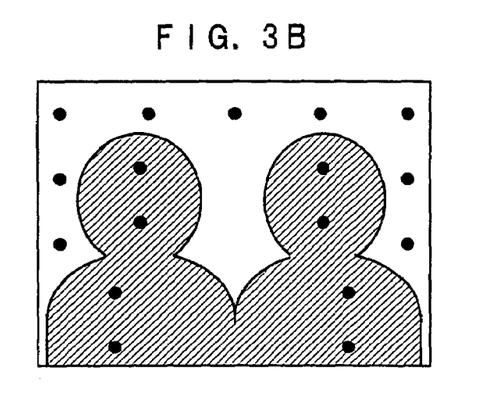
Figure 3C:
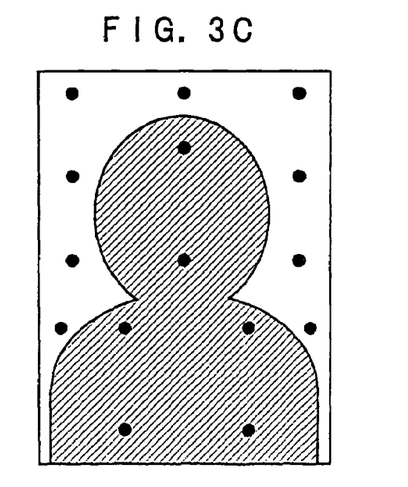

FIGS. 3A through 3C schematically show, as examples, predetermined compositions for self-photographing. FIG. 3A is a subject image which is long in the lateral direction, and shows a composition in which the photographer himself, who is indicated by the hatching, is located in the center. FIG. 3B is a subject image which is long in the lateral direction, and shows a composition in which two people, including the photographer and indicated by the hatching, are located in the center. FIG. 3C is a subject image which is long in the vertical direction, and shows a composition in which the photographer himself, who is indicated by the hatching, is located in the center.

In the present embodiment, information, which expresses the distribution of the contrast values obtained from the image information expressing the subject images photographed in the respective compositions (FIGS. 3A through 3C) is used as the reference pattern information. Note that, in the present embodiment, the contrast values at the positions shown by the black dots in FIGS. 3A through 3C are respectively sampled, and information expressing the positions in the subject image and the contrast values is used as the distribution of the contrast values.

Positions, at which a person who is the subject image should be positioned in a predetermined composition even when the sizes and shapes of the person are somewhat different (the positions within the regions shown by the hatching in FIGS. 3A through 3C), or positions which are thought to be positions which should be the background (the positions in the regions other than the region shown by hatching in FIGS. 3A through 3C), can be used as the positions shown by the black dots.

This reference pattern information is pattern information expressed by image information which is read-out and acquired by the CPU 32, and is used in comparison with photograph pattern information corresponding to the reference pattern information.

Next, operation of the digital camera 10 relating to the present embodiment will be described. First, description will be given of a summary of operations focusing on the processing of the signal expressing the subject image of the digital camera 10, in a case in which the photographing mode is set.

First, image pickup of the subject image via the optical unit 13 and by the CCD 14 is carried out, and signals expressing the subject image are successively outputted from the CCD 14 to the CDS 16.

The CDS 16 carries out correlated double sampling processing on the signals inputted from the CCD 14, and successively outputs analog image signals of R (red), G (green), and B (blue) obtained thereby to the ADC 18.

The ADC 18 converts the analog image signals of R, G, B, which are inputted from the CDS 16, into R, G, B signals of 12 bits each (digital image data), and outputs the digital image data to the image input controller 20.

The digital image data, which is successively inputted from the ADC 18, is accumulated in the line buffer built-in the image input controller 20, and is once stored in a predetermined region of the second memory 40.

The digital image data, which is stored in the predetermined region of the second memory 40, is read-out by the image signal processing circuit 22 under the control by the CPU 32. White balance adjustment is carried out on this digital image data by applying a digital gain corresponding to the physical amounts (the photometric data) detected by the AE/AWB detecting circuit 36, and gamma processing and sharpness processing are carried out, and 8-bit digital image data is generated. This digital image data is subjected to YC signal processing such that a luminance signal Y and chroma signals Cr, Cb (hereinafter called "YC signals") are generated, and these YC signals are stored in a region of the second memory 40 which region is different than the aforementioned predetermined region.

The LCD 30 is structured so as to display a dynamic image (through images) obtained by the continuous image pickup by the CCD 14, and to be able to be used as a finder. When the LCD 30 is used as a finder in this way, the generated YC signals are successively outputted to the LCD 30 via the video/LCD encoder 28. In this way, the through images are displayed on the LCD 30.

At the time when the release button 52A is set by the user in the half-depressed state, the AE function works as described above at the respective image pickup systems, and the exposure state is set. Thereafter, the AF function works, and the focus is controlled. Thereafter, at the time when the release button 52A is pushed in continuation so as to be set at its completely-depressed state, the YC signals stored in the second memory 40 at that point in time are compressed in a predetermined compression format (JPEG in the present embodiment) by the compression/decompression processing circuit 24, and thereafter, are recorded in the recording medium 43 via the media controller 42.

In the digital camera 10 relating to the present embodiment, the self-photographing mode can be set by operation of the user based on an unillustrated menu screen or the like which can be displayed in the state in which the photographing mode is set.

Figure 4:
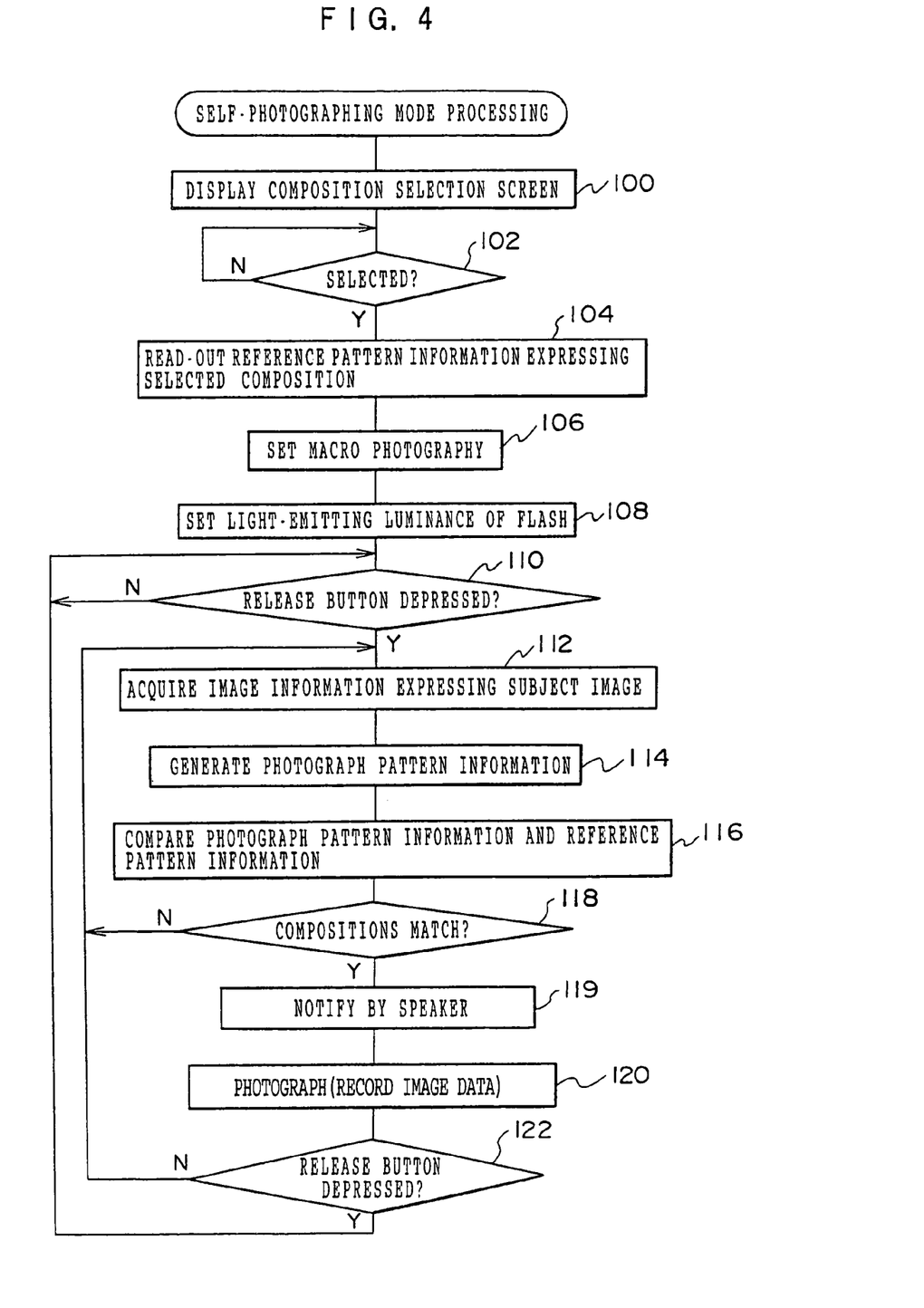
FIG. 4 is a flowchart showing the flow of processings of a self-photographing mode processing program relating to the embodiment of the present invention.

Hereinafter, the self-photographing mode processing relating to the present embodiment will be described with reference to FIG. 4. FIG. 4 is a flowchart showing the flow of the processings of the self-photographing mode processing program which is executed at the CPU 32 in a case in which the self-photographing mode is set.

First, in step 100, a composition selection screen is displayed.

Figure 5:
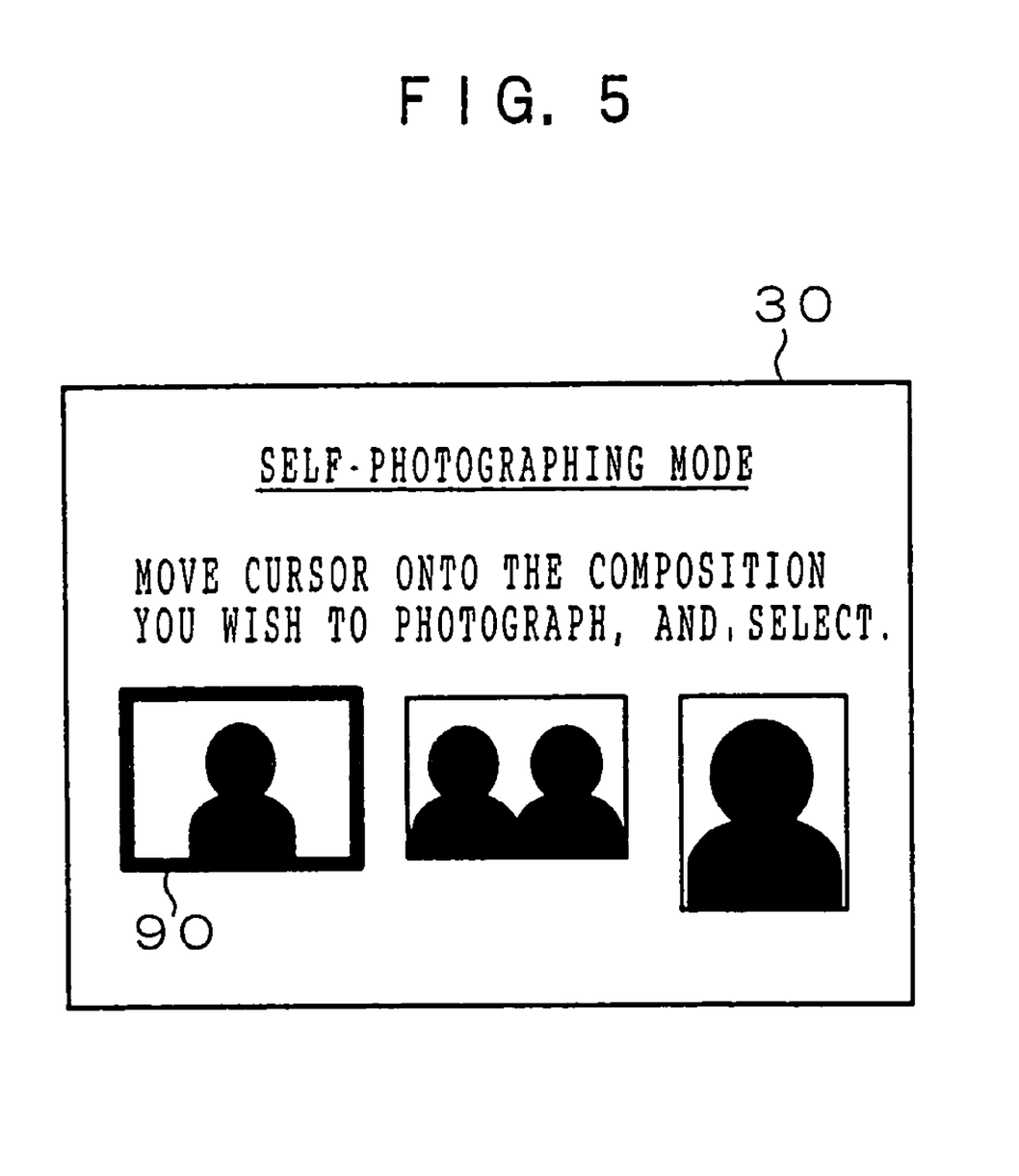
FIG. 5 is a diagram schematically showing an example of a composition selection screen displayed on an LCD in the self-photographing mode processing.

An example of the composition selection screen is shown in FIG. 5. As shown in FIG. 5, images schematically showing the above-described three compositions (see FIGS. 3A through 3C) are displayed in the composition selection screen, and a cursor 90 designating one of these three compositions is displayed. Further, "Self-Photographing Mode" is displayed in order to show that this composition selection screen is a screen relating to the self-photographing mode. The message "Move cursor onto the composition you wish to photograph, and select." urging the user to select the composition that he wishes to photograph is also displayed.

In this way, the user moves the cursor 90 to the position indicating the image showing the desired composition, by operating the up-down direction keys or the left-right direction keys of the cross cursor button 52C, and thereafter, selects the image by operating the select key of the cross cursor button 52C.

In next step 102, the digital camera 10 waits for selection of one of the compositions by the user operating the select key. In following step 104, the reference pattern information expressing the selected composition is read-out. Thereafter, the routine moves on to step 106, and the setting relating to photographing of the digital camera 10 is made to be a setting corresponding to macro photography. Thereafter, the routine moves on to step 108 where setting with respect to the flash emitting control unit 96 is carried out in order to lower the light-emitting luminance of the flash to lower than normal, and thereafter, the routine moves on to step 110.

The light-emitting luminance of the flash may be set such that light is emitted at a luminance which is lower than normal, or may be set such that the emission of light is prohibited.

In step 110, the digital camera 10 waits until the release button 52A is pushed. In following step 112, the image information picked-up by the CCD 14 is acquired. Thereafter, the routine moves on to step 114 where photograph pattern information is generated. Thereafter, the routine proceeds to step 116 where the generated photograph pattern information and the read-out reference pattern information are compared.

Here, the photograph pattern information is structured by the contrast values of predetermined positions in the image information acquired from the AF detecting circuit 34 and obtained by image pickup, and expresses the distribution of the contrast values in the image information obtained by image pickup. The photograph pattern information corresponds to information which is structured from the positions and the contrast values in the subject image that has been stored as reference pattern information, and which information expressing the distribution of the contrast values.

However, even if the composition is the same subject image, the contrast values differ in accordance with the photographing conditions, such as the type of the light source, the settings of the digital camera at the time of photographing, and the like. Therefore, the comparison of the photograph pattern information and the reference pattern information must be carried out by paying attention to whether the trends of the distributions of the contrast values are similar or not.

With regard to the distribution of the contrast values, for example, in the subject image of the composition shown in FIG. 3A which is expressed by image information acquired with macro photography being set, the focal point coincides with the person. Therefore, in this image information, the contrast values based on the image information expressing the person tend to be greater than the contrast values based on the image information expressing the other subject (the background).

Therefore, it can be thought that the trends are similar in a case in which, for example, a difference which is similar to that of the reference pattern information arises in the contrast values of positions where the person should be positioned in the predetermined composition (the positions within the hatched region in FIGS. 3A through 3C), and the contrast values of the positions which should be the background (the positions in the region other than the hatched region in FIGS. 3A through 3C). It can therefore be judged that this is the predetermined composition.

In next step 118, it is judged whether or not the composition of the subject image which is expressed by the acquired image information coincides with selected composition. If the determination is negative, the routine again returns to step 112. On the other hand, if it is determined, by comparison of the reference pattern information and the photograph pattern information, that the trends of the distributions of the contrast values are similar, the determination in step 118 is affirmative. The routine moves on to step 119, where notice is given that the compositions match, by generating a voice expressing that the compositions match by the speaker 72 via the voice output processing unit 70. Thereafter, the routine moves on to step 120, where control is carried out to record the acquired image information on the recording medium 43, and thereafter, the routine proceeds to step 122.

Here, when the user is to complete recording of the subject image of the selected composition, he pushes down on the release button 52A.

In step 122, it is judged whether or not the release button 52A is depressed. If this determination is negative, the routine returns to step 112, and the processings of steps 112 through 122 are repeated.

In this way, the image information expressing the subject image of the desired composition can be automatically recorded, during the period of time from the time that the release button 52A is depressed and operated to the time that the angle or position of the digital camera 10 is changed and the release button 52A is again depressed and operated.

On the other hand, when a signal expressing that the release button 52A has been depressed by the user is inputted, the determination in step 122 is affirmative, and the routine returns to step 110.

The present self-photographing mode processing ends due to another photographing mode being selected from the menu screen or the like, or due to the mode switching switch 52B being operated.

As described in detail above, in accordance with the present embodiment, the digital camera has the CCD 14 which acquires the image information expressing the subject image. Reference pattern information, which expresses a composition for which photographing is desired, is stored in advance in the first memory 38. The CPU 32 compares the reference pattern information and the photograph pattern information, which is pattern information expressed by the image information acquired from the CCD 14 and which corresponds to the reference pattern information. The CPU 32 determines whether or not the subject image expressed by that image information is the composition for which photographing is desired. If the CPU 32 judges that the subject image is the composition which the user wishes to photograph, the CPU 32 carries out control such that that image information is recorded. Therefore, regardless of the form of usage, the digital camera can record the desired image information easily and quickly.

In accordance with the present embodiment, contrast values at plural, predetermined positions of the composition for which photographing is desired, are used as the reference pattern information. On the basis of the image information acquired by the CCD 14, contrast values at those predetermined, plural positions of the subject image are used as the photograph pattern information. Accordingly, the reference pattern and the photograph pattern can be easily compared by using, as the predetermined, plural positions, positions at which there can be considered to be a large difference in the contrast values in the desired composition.

In the present embodiment, it is determined whether or not the compositions match, by using contrast values which are utilized in the focus control. Therefore, there is no need to provide a special means for the determination of the composition relating to the present invention.

In accordance with the present embodiment, there is also provided the speaker 72 which, when image information is recorded in the recording medium 43 via the media controller 42 by the CPU 32, gives notice of that fact. Therefore, it can be known that recording of the image information has been carried out. Further, in the self-photographing mode, the photographer can know of the state of the subject (his own facial expression, or the like). Therefore, by informing the photographer that recording of the image information has been carried out, the photographer can predict, to a certain extent, how the subject image, which is expressed by the image information recorded automatically, will be. Further, from the position, the angle, and the like of the digital camera 10 at the time of that notification, the user can know of the position, the angle, and the like of the digital camera 10 which result in the predetermined composition.

In accordance with the present embodiment, macro photography can be set. In a case in which the CPU 32 effects control to record the image information when it is judged that the subject image is the composition for which photographing is desired, the CPU 32 carries out control so that macro photography is set. Accordingly, when photographing a subject at a close distance, such as a case in which the photographer photographs himself, or a case in which the photographer wishes to photograph as large as possible insects, flowers, or the like whose configurations are similar, or the like, the photographer does not need to carry out operation for setting macro photography, and the convenience can be improved. Further, good subject images can be easily obtained even by photographers who do not know that the setting of macro photography results in better images.

Further, in accordance with the present embodiment, in a case in which the digital camera is set so that light is to be illuminated onto the subject by the flash 98, and the CPU 32 judges that the subject is the composition for which photographing is desired and carries out control so as to record that image information, the CPU 32 controls the flash emitting control unit 96 so as to lower the light-emitting luminance of the flash 98. As a result, when a subject is photographed at a close distance, such as in cases when the photographer photographs himself, or when the photographer wishes to photograph insects, flowers, or the like as large as possible, or the like, the photographer does not need to carry out adjustment of the light-emitting luminance of the flash, such as prohibiting light-emission of the flash or selecting the level of the light-emitting luminance. Therefore, the convenience can be improved. Further, good subject images can be easily obtained even by photographers who do not know that adjusting the light-emitting luminance of the flash results in better images.

In the present embodiment, explanation is given of a case in which information expressing the distribution of contrast values is used as the reference pattern information and the photograph pattern information. However, the present invention is not limited to the same. It suffices to be able to know of the border between the background portion and the image portion showing the subject for which photographing is desired, or the contour of the image portion showing the subject for which photographing is desired, and information expressing luminance values can also be applied.

The distribution of color signals expressing flesh color can be utilized, and it can be judged whether or not the state of the distribution of the flesh color is concentrated at a predetermined position (e.g., the central position of the subject image in the composition shown in FIG. 3A).

Further, in the present embodiment, description is given of a form in which the speaker 72 is used as the notifying unit, and notification is given by generating a voice. However, the present invention is not limited to the same. A lamp, an LED or the like may be provided at a position which is easy to confirm visually, such as at the front side of the digital camera 10 or the like, and notification can be given by turning the lamp or LED or the like on or causing it to blink on-and-off or the like.

The present embodiment describes a case in which the self-photographing mode can be set as one photographing mode of the digital camera 10, and the recording of image information, to which the present invention is applied, is carried out in the self-photographing mode processing. However, the present invention is not limited to the same, and the subject may be an object other than a person.

The flowchart (see FIG. 4) explained in the present embodiment is an example of a flow of processings, and appropriate modifications can be made within the scope of the gist of the present invention.

Moreover, the above structure of the digital camera 10 (see FIGS. 1 and 2) is an example, and appropriate modifications can be made within the scope of the gist of the present invention.

What is claimed is:

1. A digital camera comprising:
    an image pickup unit acquiring image information expressing a subject image;
    a memory unit in which at least one reference pattern information, which expresses a composition for which photographing is desired, is stored in advance;
    a determining unit determining whether or not the subject image expressed by the image information is the composition for which photographing is desired, by comparing the at least one reference pattern information and photograph pattern information which corresponds to the reference pattern information and which is expressed by the image information acquired by the image pickup unit; and
    a control unit effecting control such that the image information is recorded when it is determined by the determining unit that the subject image expressed by the image information is the composition for which photographing is desired.

2. The digital camera of claim 1, wherein the reference pattern information is luminance values at a plurality of predetermined positions of the composition for which photographing is desired, and the photograph pattern information is luminance values at a plurality of predetermined positions of the subject image based on the image information acquired by the image pickup unit.

3. The digital camera of claim 1, wherein the reference pattern information is contrast values at a plurality of predetermined positions of the composition for which photographing is desired, and the photograph pattern information is contrast values at a plurality of predetermined positions of the subject image based on the image information acquired by the image pickup unit.

4. The digital camera of claim 1, further comprising a notifying unit, the notifying unit carrying out a predetermined notification operation when the control unit effects control such that the image information is recorded.

5. The digital camera of claim 1, wherein the control unit can set macro photography, and when the determining unit determines that the subject image coincides with the composition for which photographing is desired, and the control unit effects control such that the image information is recorded, the control unit carries out setting of the macro photography.

6. The digital camera of claim 1, wherein, when the digital camera is set such that emitted light is irradiated onto a subject by a flash, and the determining unit determines that the subject image is the composition for which photographing is desired, the control unit controls the flash so as to lower a light-emitting luminance of the flash.

7. A digital camera comprising:
    an image pickup unit acquiring image information expressing a subject image;
    a memory unit storing a plurality of reference pattern information which express predetermined photographic compositions which are respectively different;
    a photograph pattern generating unit generating photograph pattern information on the basis of the image information acquired by the image pickup unit;
    a determining unit comparing the photograph pattern information and a reference pattern information selected from among the plurality of reference pattern information, and determining whether or not the subject image expressed by the image information matches a photographic composition expressed by the selected reference pattern information;

a recording medium; and a control unit effecting control such that the image information is stored on the recording medium, when the determining unit determines that the subject image expressed by the image information matches the photographic composition expressed by the selected reference pattern information.

8. The digital camera of claim 7, wherein the reference pattern information is luminance values at a plurality of predetermined positions of the photographic composition, and the photograph pattern information is luminance values at a plurality of predetermined positions of the subject image based on the image information acquired by the image pickup unit.

9. The digital camera of claim 7, wherein the reference pattern information is contrast values at a plurality of predetermined positions of the photographic composition, and the photograph pattern information is contrast values at a plurality of predetermined positions of the subject image based on the image information acquired by the image pickup unit.

10. The digital camera of claim 7, further comprising a notifying unit, the notifying unit carrying out a predetermined notification operation when the control unit effects control such that the image information is recorded.

11. The digital camera of claim 7, wherein the digital camera has a macro photography function, and when the control unit effects control so as to store the image information on the recording medium, the control unit sets the macro photography function so as to make the macro photography function operate.

12. The digital camera of claim 7, wherein, when the digital camera is set such that emitted light is irradiated onto a subject by a flash, and the control unit effects control so as to store the image information on the recording medium, the control unit controls the flash so as to lower a light-emitting luminance of the flash.

13. A method of controlling a digital camera which stores a plurality of reference pattern information which express predetermined photographic compositions which are respectively different, the method comprising:

acquiring image information expressing a subject image;

generating photograph pattern information on the basis of the acquired image information;

determining whether or not the subject image expressed by the image information matches a photographic composition expressed by selected reference pattern information, by comparing the photograph pattern information and the reference pattern information selected from among the plurality of reference pattern information; and storing the image information on a recording medium, when it is determined that the subject image expressed by the image information matches the photographic composition expressed by the selected reference pattern information.

14. The method of controlling a digital camera of claim 13, wherein the reference pattern information is luminance values at a plurality of predetermined positions of the photographic composition, and the photograph pattern information is luminance values at a plurality of predetermined positions of the subject image based on the acquired image information.

15. The method of controlling a digital camera of claim 13, wherein the reference pattern information is contrast values at a plurality of predetermined positions of the photographic composition, and the photograph pattern information is contrast values at a plurality of predetermined positions of the subject image based on the acquired image information.

16. The method of controlling a digital camera of claim 13, further comprising carrying out a predetermined notification operation when the image information is stored on the recording medium.

17. The method of controlling a digital camera of claim 13, wherein the digital camera has a macro photography function, and when the image information is stored on the recording medium, the macro photography function is operated.

18. The method of controlling a digital camera of claim 13, wherein, when the digital camera is set such that emitted light is irradiated onto a subject by a flash, and the image information is stored on the recording medium, the flash is controlled such that a light-emitting luminance of the flash is lowered.

* * * * *